US010050713B2

United States Patent
Li et al.

(10) Patent No.: US 10,050,713 B2
(45) Date of Patent: Aug. 14, 2018

(54) OPTICAL TRANSCEIVER USING DUPLEX MEDIA, SELF-HOMODYNE DETECTION (SHD), COHERENT DETECTION, AND UNCOOLED LASER

(71) Applicant: Futurewei Technologies, Inc., Plano, TX (US)

(72) Inventors: Zhihong Li, San Jose, CA (US); Yan Cui, Sunnyvale, CA (US); Fei Zhu, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 77 days.

(21) Appl. No.: 15/055,204

(22) Filed: Feb. 26, 2016

(65) Prior Publication Data

US 2016/0261346 A1    Sep. 8, 2016

Related U.S. Application Data

(60) Provisional application No. 62/127,118, filed on Mar. 2, 2015.

(51) Int. Cl.
*H04B 10/63* (2013.01)
*H04B 10/40* (2013.01)
(Continued)

(52) U.S. Cl.
CPC ........... *H04B 10/40* (2013.01); *H04B 10/532* (2013.01); *H04B 10/60* (2013.01); *H04B 10/61* (2013.01); *H04B 10/63* (2013.01); *H04L 5/143* (2013.01)

(58) Field of Classification Search
CPC .. H04B 10/40; H04B 10/801; H04B 10/1143; H04B 10/532; H04B 10/63; G02B 6/4246; G02B 6/4292; H04L 5/143
See application file for complete search history.

(56) References Cited

U.S. PATENT DOCUMENTS 4,859,843 A * 8/1989 Baney ................ G01J 9/04
                                        250/227.23
5,319,438 A * 6/1994 Kiasaleh ............ H04B 10/61
                                        250/227.27

(Continued)

FOREIGN PATENT DOCUMENTS

CN    101702785 A    5/2010
CN    102170311 A    8/2011

OTHER PUBLICATIONS

Foreign Communication From a Counterpart Application, PCT Application No. PCT/CN2016/075288, English Translation of International Search Report dated May 17, 2016, 7 pages.

(Continued)

*Primary Examiner* — Ted Wang
(74) *Attorney, Agent, or Firm* — Conley Rose, P.C.

(57) ABSTRACT

An apparatus comprises an uncooled laser; a splitter coupled to the laser; a first wavelength component coupled to the splitter; a local oscillator (LO) port coupled to the first wavelength component; a modulator coupled to the splitter; a second wavelength component coupled to the modulator; and a signal port coupled to the second wavelength component. A method comprises emitting an input light; splitting the input light into a first local oscillator (LO) optical signal and a first unmodulated optical signal; modulating the first unmodulated optical signal using polarization-multiplexed, high-order modulation to produce a first modulated optical signal; transmitting the first LO optical signal to a first duplex fiber; and transmitting the first modulated optical signal to a second duplex fiber.

21 Claims, 8 Drawing Sheets

(51) Int. Cl.
H04B 10/532 (2013.01)
H04L 5/14 (2006.01)
H04B 10/60 (2013.01)
H04B 10/61 (2013.01)

(56) References Cited

U.S. PATENT DOCUMENTS

| | | | |
|---|---|---|---|
| 2003/0058499 A1* | 3/2003 | Reingand | H04B 10/2543 398/98 |
| 2005/0041253 A1 | 2/2005 | Pearson | |
| 2011/0052189 A1 | 3/2011 | Yamada et al. | |
| 2012/0269541 A1* | 10/2012 | Okabe | G03G 21/1623 399/110 |
| 2014/0193152 A1 | 7/2014 | Zhou et al. | |

OTHER PUBLICATIONS

Foreign Communication From a Counterpart Application, PCT Application No. PCT/CN2016/075288, English Translation of Written Opinion dated May 17, 2016, 4 pages.
Nakamura, M., et al., "30-Gbps (5-Gsymbol/s) 64-QAM Self-Homodyne Transmission over 60-km SSMF using Phase-Noise Cancelling Technique and ISI-Suppression based on Electronic Digital Processing," OSA/OFC/NFOEC, 2009, 3 pages.
Puttnam, B., et al., "105Tb/s Transmission System Using Low-cost, MHz Linewidth DFB Lasers Enabled by Self-Homodyne Coherent Detection and a 19-Core Fiber," OFC/NFOEC, Optical Society of America, Technical Digest, 2013, 3 pages.
Man, J., et al., "A Low-Cost 4x25Gbps PAM4 Module for Short-Reach Optical Interconnection," 2014, pp. 127-128.
Dany-Sebastien, L., et al., "Coherent Detection of Optical Quadrature Phase-Shift Keying Signals with Carrier Phase Estimation," Journal of Lightwave Technology, vol. 24, No. 1, Jan. 2006, pp. 12-21.
Liu, Z., et al., "Homodyne OFDM with Optical Injection Locking for Carrier Recovery," Journal of Lightwave Technology, vol. 33, No. 1, Jan. 1, 2015, pp. 34-41.
Miyazaki, T., et al., "Linewidth-Tolerant QPSK Homodyne Transmission Using a Polarization-Multiplexed Pilot Carrier," IEEE Photonics Technology Letters, vol. 18, No. 2, Jan. 15, 2006, pp. 388-390.
Nakamura, M., et al., "QPSK-Homodyne Transmission using a Multi-Wavelength Fabry-Perot Laser Diode," Optical Society of America, 2000, 2 pages.
Puttnam, P., et al., "Self-Homodyne Detection in Optical Communication Systems," Photonics, ISSN 2304-6732, www.mdpi.com/journal/photonics, 2014, pp. 110-130.
Schow, C.L., "Transmitter Pre-Distortion for Simultaneous Improvements in Bit-Rate, Sensitivity, Jitter, and Power Efficiency in 20 Gb/s CMOS-driven VCSEL Links," Fiber Optics links and Subsystems, Fiber Optics Components, 2011, 3 pages.
Luis, R., et al., "Coherent Detection in Self-Homodyne Systems with Single and Multi-Core Transmission," Proceedings of SPIE vol. 9389, Next-Generation Optical Communication: Components, Sub-Systems, and Systems IV, Jan. 15, 2015, 14 pages.
Foreign Communication From a Counterpart Application, European Application No. 16758470.5, Extended European Search Report dated Jan. 26, 2018, 10 pages.

* cited by examiner

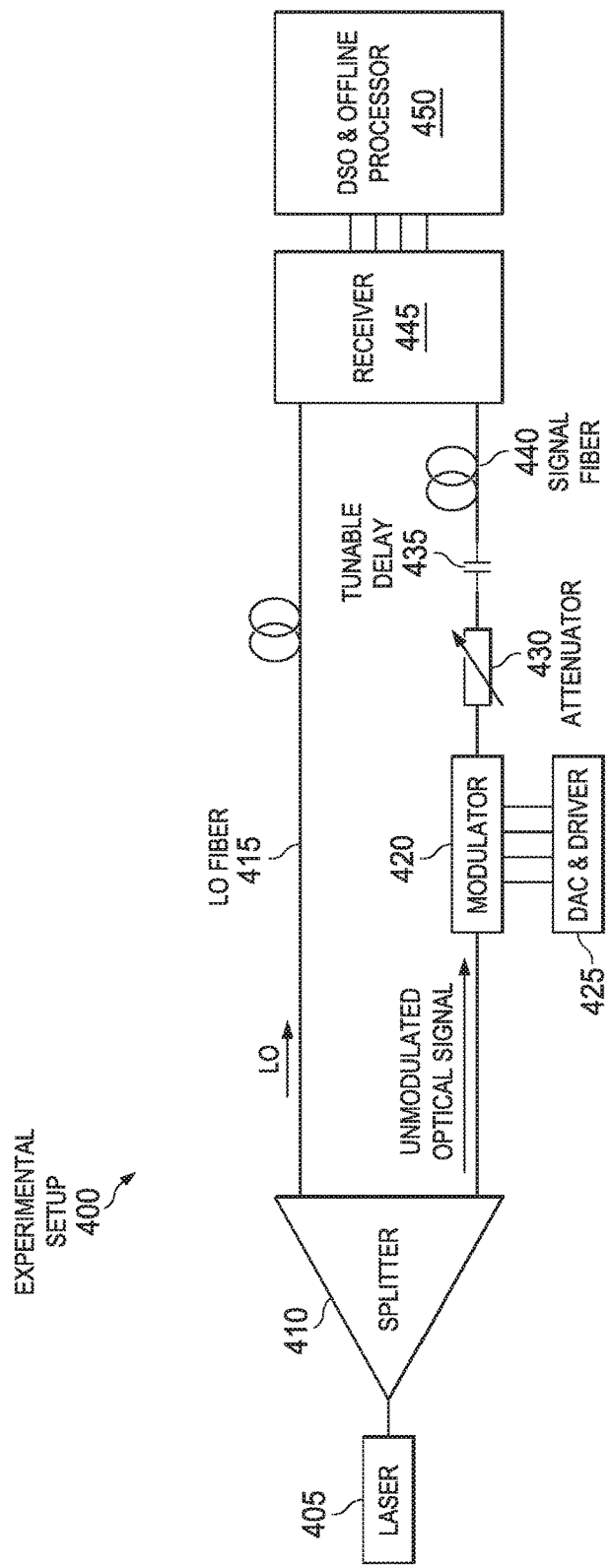

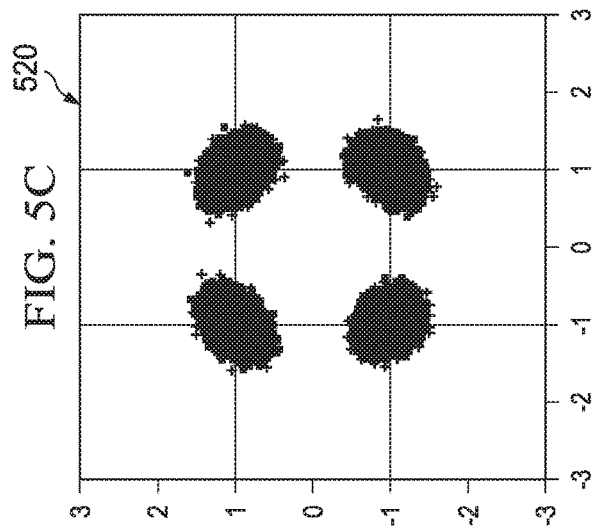
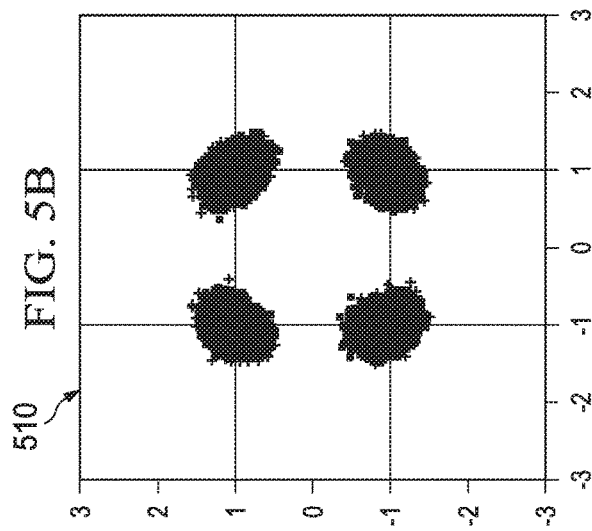
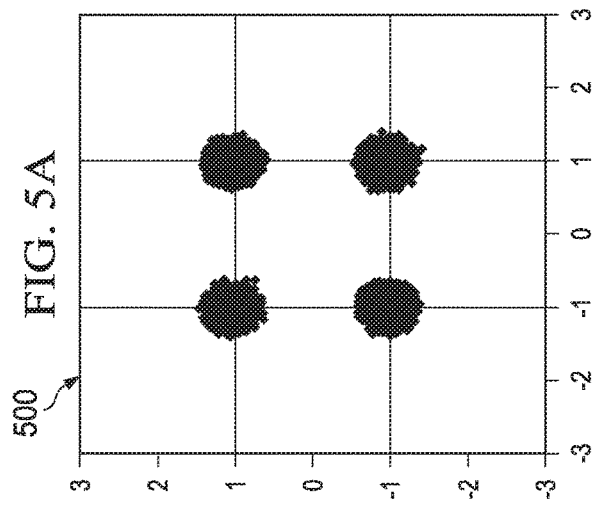

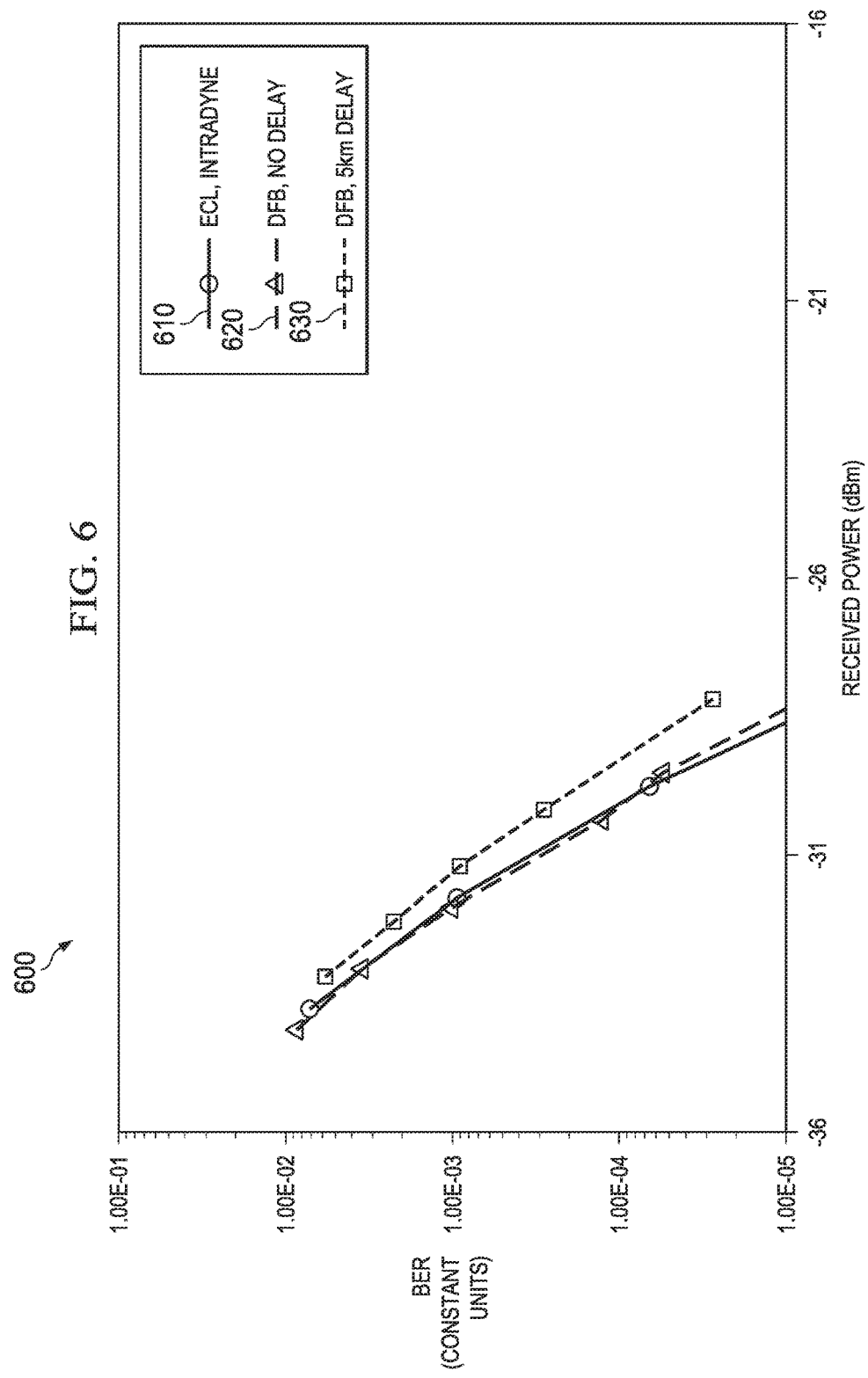

OPTICAL TRANSCEIVER USING DUPLEX MEDIA, SELF-HOMODYNE DETECTION (SHD), COHERENT DETECTION, AND UNCOOLED LASER

CROSS-REFERENCE TO RELATED APPLICATIONS

This application claims priority to U.S. provisional patent application No. 62/127,118 filed Mar. 2, 2015 by Zhihong Li, et al., and titled "Bidirectional Self-Homodyne Detection (SHD) Optical Transceiver," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The use of optical fibers as media for transmission of digital data is becoming more popular due to the high reliability and the large available bandwidth. For instance, short-reach interconnects over optical fiber on the order of a few hundred meters (m) are widely used in computer systems, data centers, and campus networks. Thus, high-capacity optical transceivers designed for short-distance transmission are in high demand, with the major tradeoffs among various solutions including performance, cost, and power consumption. Many short-reach optical transceivers operate at 1 gigabit per second (Gb/s) or 10 Gb/s and use intensity modulation and direct detection (IM-DD), one fiber pair, one wavelength, and one polarization state.

To increase the bit rate to 40 Gb/s and 100 Gb/s, both the signaling rate and the number of channels may be increased. One example is 4×25 Gb/s local area network wavelength-division multiplexing (LWDM) over a fiber pair. Another example is 4×25 Gb/s parallel single-mode 4-lane (PSM4) over parallel fibers for 100 Gigabit Ethernet (100 GbE). As Ethernet data rates scale from 100 GbE to 400 GbE, additional wavelengths and/or a higher symbol rate modulation are required to continue the IM-DD technology scheme. However, the additional wavelengths and the higher symbol rate modulation increase complexity and sensitivity penalties.

To improve system capacity and per-bit power dissipation, reduction in the number of wavelengths through the use of high-order modulation is required. Polarization multiplexing and coherent technology, which have high spectrum efficiency and sensitivity, are needed to further scale to next generation Ethernet data rates, for instance 4×250 G for Terabit Ethernet (TbE). Conventional coherent solutions require the use of frequency-locked and narrow-linewidth lasers for transmitters and local oscillators (LOs). However, the cost and complexity (e.g., frequency tracking) is too high for short-distance applications.

SUMMARY

In one embodiment, the disclosure includes an apparatus comprising: an uncooled laser; a splitter coupled to the laser; a first wavelength component coupled to the splitter; a local oscillator (LO) port coupled to the first wavelength component; a modulator coupled to the splitter; a second wavelength component coupled to the modulator; and a signal port coupled to the second wavelength component. In some embodiments, the apparatus further comprises a receiver coupled to the second wavelength component; an analog-to-digital converter (ADC) and digital signal processor (DSP) coupled to the receiver; and an interface integrated circuit (IC) coupled to the ADC and DSP and the modulator; the first wavelength component and the second wavelength component are thin-film filters (TFFs); the first wavelength component and the second wavelength component are 3 decibel (dB) optical couplers; the first wavelength component and the second wavelength component are optical isolators; the laser is a distributed feedback (DFB) laser; the laser comprises a linewidth of greater than 100 kilohertz (kHz); the laser comprises a linewidth of 1 megahertz (MHz) or greater.

In another embodiment, the disclosure includes an optical transceiver comprising: a laser configured to provide an input light; a splitter coupled to the laser and configured to split the input light into a first local oscillator (LO) optical signal and a first unmodulated optical signal; a modulator coupled to the splitter and configured to modulate the first unmodulated optical signal to produce a first modulated optical signal; an LO port configured to: couple to a first duplex fiber; and transmit the first LO optical signal to the first duplex fiber; and a signal port configured to: couple to a second duplex fiber; and transmit the first modulated optical signal to the second duplex fiber. In some embodiments, the LO port is further configured to receive a second LO optical signal from the first duplex fiber, and wherein the signal port is further configured to receive a second modulated optical signal from the second duplex fiber; the optical transceiver further comprises a receiver configured to: receive the second LO optical signal; and receive the second modulated optical signal; the receiver is configured to perform coherent detection; the optical transceiver further comprises a first wavelength component coupled to the splitter, the receiver, and the LO port and configured to: pass the first LO optical signal to only the LO port; and pass the second LO optical signal to only the receiver; the optical transceiver further comprises a second wavelength component coupled to the modulator, the receiver, and the signal port and configured to: pass the first modulated optical signal to only the signal port; and pass the second modulated optical signal to only the receiver; the optical transceiver further comprises a receiver, wherein the laser and the receiver are configured to implement self-homodyne detection (SHD); the optical transceiver further comprises a first thin-film filter (TFF) coupled to the splitter and the LO port and configured to: pass light at a first wavelength; and reflect light at all other wavelengths; the optical transceiver further comprises a second TFF coupled to the modulator and the signal port and configured to: pass light at a second wavelength; and reflect light at all other wavelengths; the modulator is further configured to further modulate the first unmodulated optical signal using polarization-multiplexed, high-order quadrature amplitude modulation (QAM).

In yet another embodiment, the disclosure includes a method comprising: emitting an input light; splitting the input light into a first local oscillator (LO) optical signal and a first unmodulated optical signal; modulating the first unmodulated optical signal using polarization-multiplexed, high-order modulation to produce a first modulated optical signal; transmitting the first LO optical signal to a first duplex fiber; and transmitting the first modulated optical signal to a second duplex fiber. In some embodiments, the method further comprises receiving a second LO optical signal from the first duplex fiber; receiving a second modulated optical signal from the second duplex fiber; detecting amplitude information and phase information from the second modulated optical signal using the second LO optical signal to produce an analog detected signal; converting the analog detected signal to a digital detected signal; and processing the digital detected signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram of an experimental setup.

FIG. 5A is a graph of a symbol constellation for the setup in FIG. 4 with no path delay.

FIG. 5B is a graph of a symbol constellation for the setup in FIG. 4 with a 42 centimeter (cm) path delay.

FIG. 5C is a graph of a symbol constellation for the setup in FIG. 4 with a 5 kilometer (km) path delay.

FIG. 6 is a graph of bit error rates (BERs) for the setup in FIG. 4 using different lasers and detection schemes.

DETAILED DESCRIPTION

Figure 1:
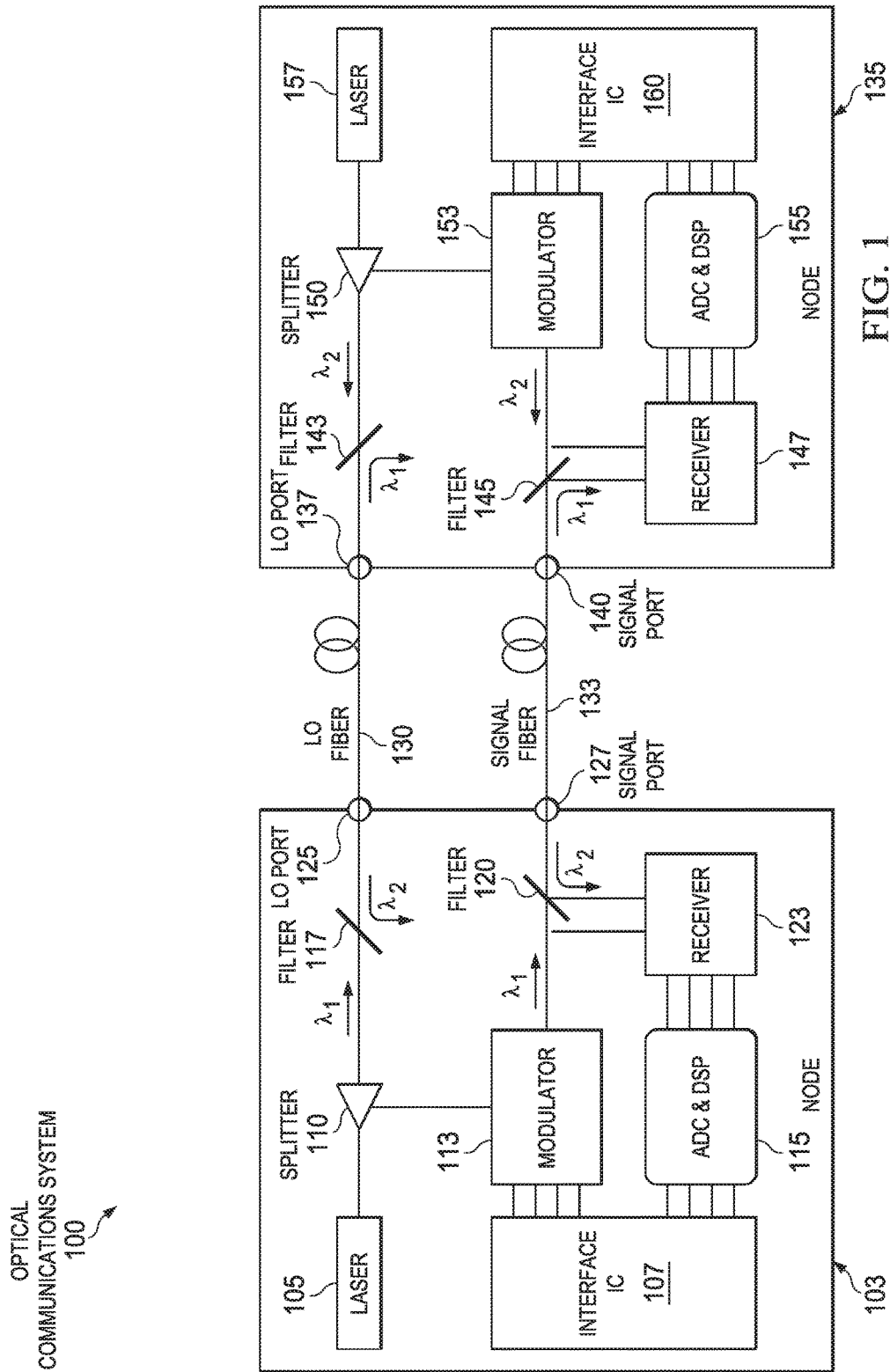
FIG. 1 is a schematic diagram of an optical communications system according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There are a few approaches to improve data rates in short-reach optical networks, including access optical networks, which refer to optical networks that have transmission distances less than 2 km. In a first approach, vertical-cavity surface-emitting lasers (VCSELs) are used as laser sources, but VCSELs are limited to 40 Gb/s operation and have poor receiver sensitivity. In a second approach, 4-level pulse amplitude modulation (4-PAM) with direct detection is used, but PAM4 requires broadband opto-electronics components, has poor receiver sensitivity, and is sensitive to the multipath interference (MPI) effect.

In a third approach, polarization-multiplexed in-phase and quadrature phase (IQ) modulation using coherent detection is used, but frequency locking and a narrow linewidth laser requiring temperature control are required for both the transmitter and the receiver. The linewidth must be narrow, meaning less than or equal to 100 kilohertz (kHz), because coherent detection is sensitive to phase noise. The laser is, for instance, an external cavity laser (ECL). The cost and power consumption of the laser and the temperature control is high.

In a fourth approach, a pilot tone with a first polarization orthogonal to a second polarization of a data signal, or simply a signal, is used as a local oscillator (LO). However, this approach suffers from a loss of spectral efficiency of 50 percent (%) compared to polarization-multiplexed systems and the number of optical transceivers has to be doubled to reach the same capacity as polarization-multiplexed approaches. There is therefore a need for transceivers that address the shortcomings described above.

Disclosed herein are embodiments for improved optical transceivers. The transceivers use duplex media, coherent detection such as SHD, and uncooled lasers. In this context, duplex means that the medium, for instance a fiber, may simultaneously communicate in both the downstream and the upstream direction. Duplex communication increases link capacity. SHD means that a transmitter transmits both an LO optical signal and a modulated optical signal at the same wavelength and that a receiver then uses the LO optical signal to perform phase noise cancellation when a light path difference between the LO optical signal and the modulated optical signal is small enough. In other words, the transmitter may have a single laser that provides both the LO optical signal and the modulated optical signal, and the receiver does not need a laser to provide the LO optical signal. Using the single laser reduces complexity and cost. Furthermore, SHD means that the phase noise of the LO optical signal and the modulated optical signal cancel out each other, which allows for simplified phase tracking in a digital signal processor (DSP) and thus lower cost and power consumption. Coherent detection means that the receiver detects both amplitude information and phase information in received signals. The coherent detection increases the tolerance to the MPI effect and improves receiver sensitivity. The uncooled laser may be, for instance, an uncooled distributed feedback (DFB) laser. An uncooled laser may be used because the LO optical signal and the modulated optical signal are at the same wavelength, so there is no linewidth requirement for the laser. This reduces cost and power consumption. Finally, the transceivers allow for use of polarization-multiplexed, high-order quadrature amplitude modulation (QAM), which provides high spectrum efficiency, tolerance to the MPI effect, improved receiver sensitivity, and improved system capacity and per-bit power dissipation compared to other high-level amplitude modulation formats. In this context, a high order QAM means that both in-phase (I) and quadrature phase (Q) signals use high-level amplitude modulation on the order of 3 or above. The transceivers are suited for short-reach optical networks. However, the transceivers may be used in long-haul networks and other suitable networks.

FIG. 1 is a schematic diagram of an optical communications system 100 according to an embodiment of the disclosure. The system 100 generally comprises a node 103 and a node 135 coupled to each other via a LO fiber 130 and a signal fiber 133. The nodes 103, 135 both transmit and receive signals to each other. The nodes 103, 135 therefore comprise transceivers and provide bidirectional communication in the system 100. A first direction from the node 103 to the node 135 in this example is referred to as a downstream direction, and a second direction from the node 135 to the node 103 is referred to as an upstream direction. The nodes 103, 135 can be, for instance, separate switches at different locations in a data center. The nodes 103, 135 may be within 2 km of each other and may therefore make up a short-reach optical network. The nodes 103, 135 may comprise additional components as well.

The node 103 comprises a laser 105, an interface integrated circuit 107, a splitter 110, a modulator 113, an analog-to-digital converter (ADC) and DSP 115, a filter 117, a filter 120, a receiver 123, a LO port 125, and a signal port 127. The laser 105 is any laser that provides continuous wave (CW) light at a pre-determined wavelength $\lambda_1$. The wavelength $\lambda_1$ may be in the O band, which is from about 1,260 nanometers (nm) to about 1,360 nm, or the C/L band, which is from about 1,530 nm to about 1,625 nm. For instance, the laser 105 is a DFB laser without temperature control or other wavelength control. In that case, the laser 105 may be referred to as an uncooled laser. The laser 105 may have a linewidth greater than 100 kHz and even as great as 1 megahertz (MHz) or higher. The node 103 need not comprise additional lasers.

The interface IC 107 provides electrical data signals to the modulator 113 and processes digital detected signals from the ADC & DSP 115. The splitter 110 splits an input light traveling from the laser 105 into an LO optical signal and an unmodulated optical signal. The splitter 110 may be a 3 decibel (dB) splitter, or divider, and may therefore evenly split the input light so that 50% of the input light forms the LO optical signal and 50% of the input light forms the unmodulated optical signal, for example. Alternatively, the splitting percentage is optimized to a different percentage based on a configuration of the system 100.

The modulator 113 is a polarization-multiplexing IQ modulator. The modulator 113 modulates optical carriers using both amplitude information and phase information, for instance using high-order QAM, based on electrical data signals from the interface IC 107. The modulator 113 may also use any other suitable modulation format.

The ADC & DSP 115 comprises a coherent DSP. Because the phase noise of the LO optical signal and the modulated optical signal cancel out each other due to SHD, the DSP may have simplified phase tracking. The ADC & DSP 115 receives analog detected signals from the receiver 123, processes the analog detected signals, converts the analog detected signals to digital detected signals, and forwards the digital detected signals to the interface IC 107 for further processing.

The filters 117, 120 pass light at the wavelength $\lambda_1$ and reflect light at all other wavelengths in a designed stopband, including a pre-determined wavelength $\lambda_2$. The wavelength $\lambda_2$ may be in the O band or the C/L band. The filters 117, 120 may be thin-film filters (TFFs). The receiver 123 is a coherent receiver. The LO port 125 couples to the LO fiber 130, and the signal port 127 couples to the signal fiber 133.

The LO fiber 130 and the signal fiber 133 are duplex fibers, or duplex media. Specifically, the LO fiber 130 and the signal fiber 133 each comprise two sub-fibers coupled to each other. The two sub-fibers may be coupled in a "zipcord," or side-by-side, fashion. One sub-fiber provides downstream communication and the other sub-fiber provides upstream communication so that the LO fiber 130 and the signal fiber 133 provide bidirectional communication. The system 100 therefore need not comprise additional fibers, for instance a first fiber for downstream LO optical signals, a second fiber for upstream LO optical signals, a third fiber for downstream modulated optical signals, and a fourth fiber for upstream modulated optical signals. The LO fiber 130 and the signal fiber 133 may be 2 km or less. The LO fiber 130 and the signal fiber 133 do not use space-division multiplexing (SDM).

The node 135 is similar to the node 103. Specifically, the node 135 comprises a LO port 137, a signal port 140, a filter 143, a filter 145, a receiver 147, a splitter 150, a modulator 153, an ADC & DSP 155, a laser 157, and an interface IC 160 that are similar to the LO port 125, the signal port 127, the filter 117, the filter 120, the receiver 123, the splitter 110, the modulator 113, the ADC & DSP 115, the laser 105, and the interface IC 107, respectively. However, unlike the laser 105, the laser 157 provides light at the wavelength $\lambda_2$. In addition, unlike the filters 117, 120, the filters 143, 145 pass light at the wavelength $\lambda_2$ and reflect light at all other wavelengths in a designed stopband, including the wavelength $\lambda_1$.

In a first example, for the node 103 to transmit downstream to the node 135, the laser 105 emits an input light with a wavelength of $\lambda_1$ to the splitter 110. The splitter 110 splits the input light into an LO optical signal and an unmodulated optical signal, both with a wavelength of $\lambda_1$, passes the LO optical signal to the filter 117, and passes the unmodulated optical signal to the modulator 113. The filter 117 passes the LO optical signal through the LO port 125 and towards the LO fiber 130. The modulator 113 receives an electrical data signal from the interface IC 107, modulates the unmodulated optical signal using both amplitude information and phase information based on the electrical data signal to produce a modulated optical signal, and forwards the modulated optical signal to the filter 120. The filter 120 passes the modulated optical signal through the signal port 127 and towards the signal fiber 133.

The node 135 receives the LO optical signal through the LO port 137 and receives the modulated optical signal through the signal port 140. The filter 143 receives the LO optical signal and reflects the LO optical signal towards the receiver 147. The filter 145 receives the modulated signal and reflects the modulated optical signal towards the receiver 147. The receiver 147 performs coherent detection of the modulated optical signal using the LO optical signal to determine a digital detected signal. Specifically, the receiver 147 detects both amplitude information and phase information. The receiver 147 passes an analog detected signal to the ADC & DSP 155, which processes the analog detected signal, converts the analog detected signal to a digital detected signal, and forwards the digital detected signal to the interface IC 160 for further processing.

In a second example, for the node 135 to transmit upstream to the node 103, a mirror image of the first example occurs. Specifically, the laser 157 emits an input light with a wavelength of $\lambda_2$ towards the splitter 150. The splitter 150 splits the input light into an LO optical signal and an unmodulated optical signal, both with a wavelength of $\lambda_2$, passes the LO optical signal to the filter 143, and passes the unmodulated optical signal to the modulator 153. The filter 143 passes the LO optical signal through the LO port 137 and to the LO fiber 130. The modulator 153 receives an electrical data signal from the interface IC 160, modulates the unmodulated optical signal using both amplitude information and phase information based on the electrical data signal to produce a modulated optical signal, and forwards the modulated optical signal to the filter 145. The filter 145 passes the modulated optical signal through the signal port 140 and towards the signal fiber 133.

The node 103 receives the LO optical signal through the LO port 125 and receives the modulated optical signal through the signal port 127. The filter 117 receives the LO optical signal and reflects the LO optical signal towards the receiver 123. The filter 120 receives the modulated optical signal and reflects the modulated optical signal towards the receiver 123. The receiver 123 performs coherent detection of the modulated optical signal using the LO optical signal to determine a digital detected signal. Specifically, the receiver 123 detects both amplitude information and phase information. The receiver 123 passes an analog detected signal to the ADC & DSP 115, which processes the analog detected signal, converts the analog detected signal to a digital detected signal, and forwards the digital detected signal to the interface IC 107 for further processing.

Optical fiber connectors between the nodes 103, 135 on the one hand and the LO fiber 130 and the signal fiber 133 on the other hand may create a closed loop, which causes the LO optical signals and the modulated optical signals to circulate back and forth with a certain amount of attenuation at each reflection point and to therefore interfere with the original LO optical signals and original modulated optical signals. This phenomenon is the cause of MPI effect. More connectors lead to a higher MPI effect. Because the system 100 uses the LO fiber 130 and the signal fiber 133, which are duplex fibers and therefore use less fibers and less connectors, the system 100 is more resistant to the MPI effect.

The system 100 provides duplex media, SHD, coherent detection, and uncooled lasers. Specifically, the LO fiber 130 and the signal fiber 133 implement duplex media. The lasers 105, 157 (generating both the LO optical signals and the unmodulated optical signals at the same wavelength) implement SHD. The receivers 123, 147 (detecting both amplitude information and phase information) implement coherent detection. Finally, the lasers 105, 157 are uncooled lasers and may be so because the lasers 105, 157 generate both the LO optical signals and the unmodulated optical signals at the same wavelengths, so that wavelength control and thus narrow linewidth lasers are not needed.

Figure 2:
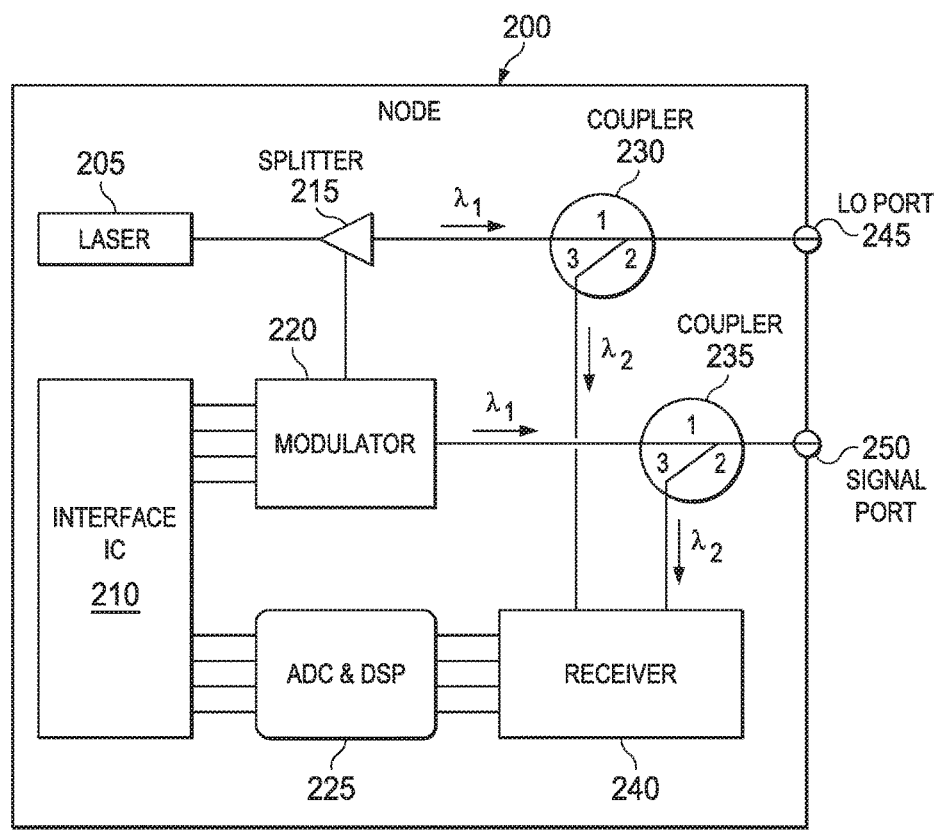
FIG. 2 is a schematic diagram of a node according to an embodiment of the disclosure.

FIG. 2 is a schematic diagram of a node 200 according to an embodiment of the disclosure. The node 200 may be part of an optical communications system similar to the system 100. The node is similar to the node 103 in FIG. 1. Specifically, the node 200 comprises a laser 205, an interface IC 210, a splitter 215, a modulator 220, an ADC & DSP 225, a receiver 240, a LO port 245, and a signal port 250 that are similar to the laser 105, the interface IC 107, the splitter 110, the modulator 113, the ADC & DSP 115, the receiver 123, the LO port 125, and the signal port 127. However, unlike the node 103, the node 200 comprises a coupler 230 in place of the filter 117 and a coupler 235 in place of the filter 120.

The couplers 230, 235 are optical directional couplers comprising a port 1, a port 2, and a port 3. Thus, the coupler 230 receives an LO optical signal from the laser 205, the splitter 215, and port 1, then passes the LO optical signal from port 2 to the LO port 245. The coupler 230 does not pass the LO optical signal from port 3. In addition, the coupler 230 receives an LO optical signal from another node, the LO port 245, and port 2, then passes the LO optical signal from port 3 to the receiver 240. The coupler 230 does not pass the LO optical signal from port 1. Likewise, the coupler 235 receives a modulated optical signal from the modulator 220 and port 1, then passes the modulated optical signal from port 2 to the signal port 250. The coupler 235 does not pass the modulated optical signal from port 3. In addition, the coupler 235 receives a modulated optical signal from another node, the signal port 250, and port 2, then passes the modulated optical signal from port 3 to the receiver 240. The coupler 235 does not pass the modulated optical signal from port 1. The couplers 230, 235 may be 3 dB couplers.

The couplers 230, 235 provide flexibility by allowing the laser 205 to provide light at wavelength $\lambda_1$ that need not be pre-determined. Likewise, the node 200 may receive light at a wavelength $\lambda_2$ that need not be pre-determined. $\lambda_1$ and $\lambda_2$ need not be pre-determined because the node 200 does not comprise filters like the filters 117, 120, 143, 145, which pass and reflect light at pre-determined wavelengths.

In order to avoid reflection noise due to the couplers 230, 235, the node 200 may implement dual-wavelength operation, which means that $\lambda_1$ and $\lambda_2$ are different. $\lambda_1$ and $\lambda_2$ may vary with an ambient temperature, which may vary between about −40 degrees Celsius (° C.) and about 85° C. Thus, if $\lambda_1$ and $\lambda_2$ vary about 0.1 nm per ° C., then $\lambda_1$ and $\lambda_2$ should be at least 12.5 nm apart.

Figure 3:
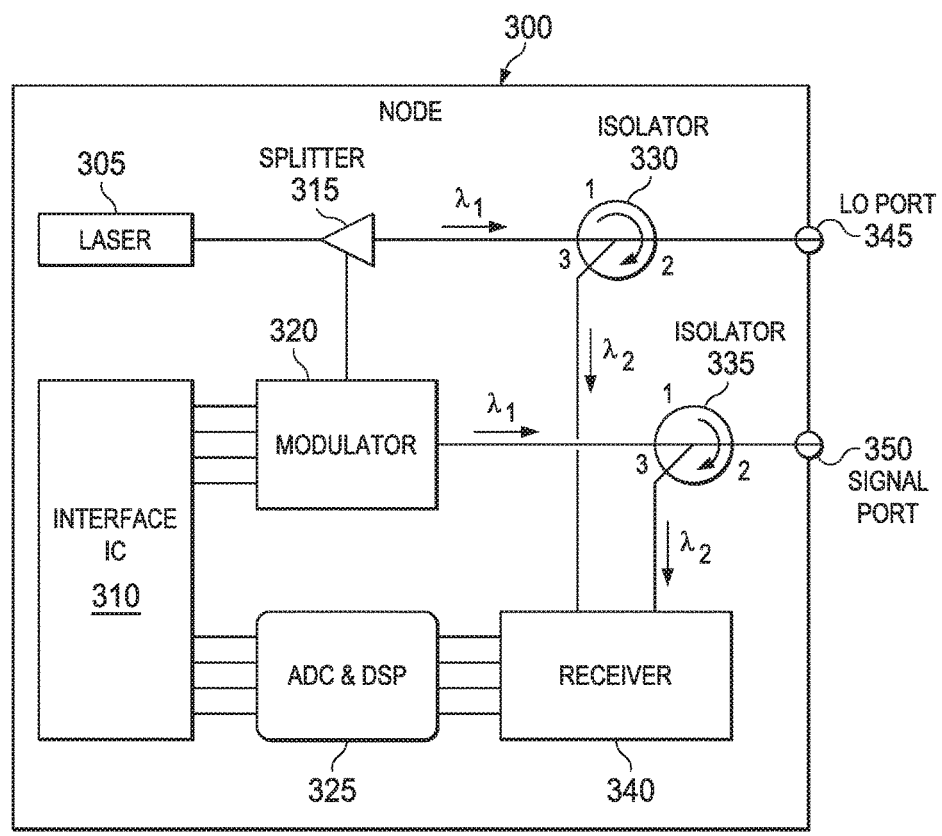
FIG. 3 is a schematic diagram of a node according to another embodiment of the disclosure.

FIG. 3 is a schematic diagram of a node 300 according to another embodiment of the disclosure. The node is similar to the node 200 in FIG. 2. Specifically, the node 300 comprises a laser 305, an interface IC 310, a splitter 315, a modulator 320, an ADC & DSP 325, a receiver 340, an LO port 345, and a signal port 350 that are similar to the laser 205, the interface IC 210, the splitter 215, the modulator 220, the ADC & DSP 225, the receiver 240, the LO port 245, and the signal port 250. However, unlike the node 200, the node 300 comprises an isolator 330 in place of the coupler 230 and an isolator 335 in place of the coupler 235.

The isolators 330, 335 are optical isolators and function similarly to the couplers 230, 235. Specifically, the isolators 330, 335 comprise a port 1, a port 2, and a port 3. Thus, the isolator 330 receives an LO optical signal from the laser 305, the splitter 315, and port 1, then passes the LO optical signal from port 2 to the LO port 345. The isolator 330 does not pass the LO optical signal from port 3. In addition, the isolator 330 receives a LO optical signal from another node, the LO port 345, and port 2, then passes the LO optical signal from port 3 to the receiver 340. The isolator 330 does not pass the LO optical signal from port 1. Likewise, the isolator 335 receives a modulated optical signal from the modulator 320 and port 1, then passes the modulated optical signal from port 2 to the signal port 350. The isolator 335 does not pass the modulated optical signal from port 3. In addition, the isolator 335 receives a modulated optical signal from another node, the signal port 350, and port 2, then passes the modulated optical signal from port 3 to the receiver 340. The isolator 335 does not pass the modulated optical signal from port 1. The isolators 330, 335 may reduce insertion loss compared to the couplers 230, 235. Insertion loss refers to the loss of signal power resulting from the inclusion of devices in a communication medium or device.

The system 100 in FIG. 1 uses the filters 117, 120, 143, 145; the node 200 in FIG. 2 uses the couplers 230, 235; and the node 300 in FIG. 3 uses the isolators 330, 335. Those components may be generically referred to as wavelength components herein. Other suitable wavelength components may be used in place of those components.

FIG. 4 is a schematic diagram of an experimental setup 400. The setup 400 was used to model performance of the nodes 103, 135, 200, 300. The setup 400 comprises a laser 405, a splitter 410, an LO fiber 415, a modulator 420, a digital-to-analog converter (DAC) & driver 425, an attenuator 430, a tunable delay 435, a signal fiber 440, a receiver 445, and a digital store oscilloscope (DSO) and offline processor 450. The setup 400 was used to model the nodes 103, 135, 200, 300 described above in order to provide the performance metrics described below.

The laser 405 is an uncooled DFB laser with a linewidth of 1.5 MHz. The splitter 410 splits an input light from the laser 405 into an LO optical signal and unmodulated optical signal, and passes the LO optical signal to a top path and the unmodulated optical signal to a bottom path. The top path comprises the LO fiber 415, and the bottom path comprises the modulator 420, the attenuator 430, the tunable delay 435, and the signal fiber 440. The DAC & driver 425 comprises a DAC with four channels and a 56 gigahertz (GHz) sampling rate to generate high-speed electrical data. The DAC & driver 425 map $2^{15}$ pseudorandom binary sequences (PRBSs) to 28 gigabaud (Gbaud) dual-polarization, order 16 QAM (16-QAM). The attenuator 430 adjusts a power of a modulated optical signal, while a power of the LO optical signal is set to 8.5 decibel milliwatts (dBm). The tunable delay 435 provides a tunable delay in order to adjust a path length difference between the top path and the bottom path.

FIG. 5A is a graph 500 of a symbol constellation for the setup 400 in FIG. 4 with no path delay. FIG. 5B is a graph 510 of a symbol constellation for the setup 400 in FIG. 4 with a 42 cm path delay. FIG. 5C is a graph 520 of a symbol constellation for the setup 400 in FIG. 4 with a 5 km path delay. For the graphs 500, 510, 520, both the x-axes and the y-axes represent constant or arbitrary units. As can be seen, the graph 500 shows that, with perfect light path alignment, in other words, with no path delay, the constellation plots are neatly defined, indicating complete cancellation of phase noise. The graph 510 shows that, with a 42 cm path delay, the constellation plots are not as neatly defined and instead are ovular and expand along an angular direction, indicating some phase noise. The graph 520 shows that, with a 5 km path delay, the constellation plots are very similar to the constellation plots in the graph 510, except for a slight increase in amplitude noise due to a conversion from phase noise to amplitude noise resulting from chromatic dispersion of the signal fiber 440. The graphs 500, 510, 520 show that, when using the laser 405, which is an uncooled DFB laser, the phase between the LO optical signal and the modulated optical signal is uncorrelated beginning with about 42 cm of path delay. In other words, the noise is due mostly to the path delay and not the linewidth of the laser 405.

FIG. 6 is a graph 600 of BERs for the setup 400 in FIG. 4 using different lasers and detection schemes. The x-axis represent the power in units of dBm of signals received by the receiver 445, and the y-axis represents BER in constant or arbitrary units. A diamond plot 610 results from using an ECL laser with a linewidth less than 100 kHz for the laser 405 and using intradyne detection, which in this context means that separate lasers are used for the LO optical signal and the unmodulated optical signal. A triangle plot 620 results from using an uncooled DFB laser with a linewidth of 1.5 MHz for the laser 405, using SHD, and inserting no path delay. A square plot 630 results from using a DFB laser for the laser 405, using SHD, and inserting a 5 km path delay. As shown, the diamond plot 610 and the triangle plot 620 are virtually identical, meaning that using the uncooled DFB laser, which has a linewidth at least 10 times that for the ECL laser, causes almost no performance degradation when there is no path delay. The square plot 630 is slightly to the right of the diamond plot 610 and the triangle plot 620. The square plot 630 therefore shows that, even with a 5 km path delay, there is only a 0.6 dBm penalty for the received power. In other words, the uncooled DFB laser and SHD approach is very tolerant to a path delay.

Figure 7A:
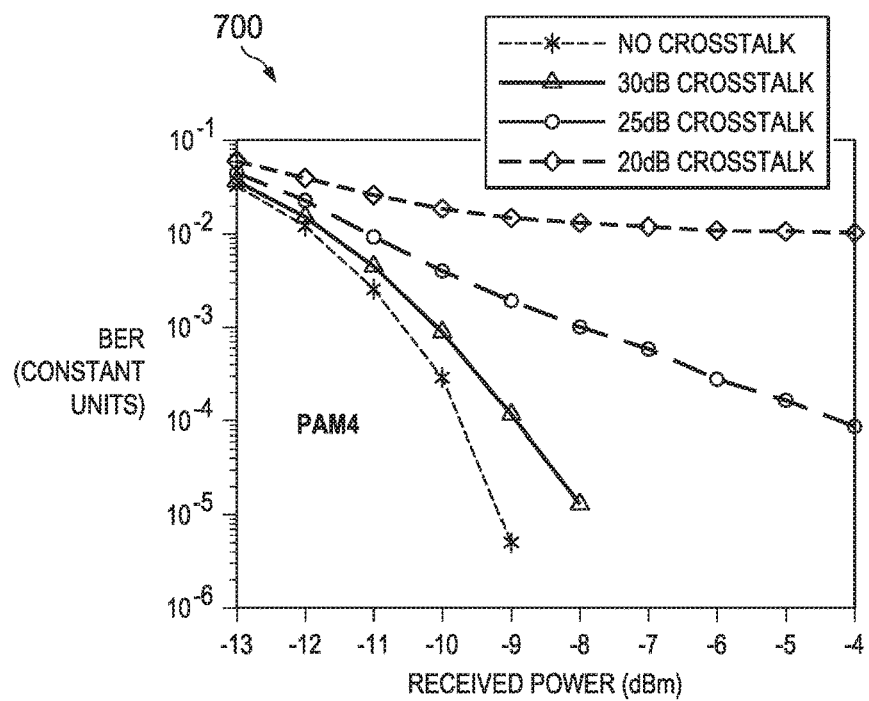
FIG. 7A is a graph of BER for the setup of FIG. 4 using 4-level pulse-amplitude modulation (PAM4) with various crosstalks.
Figure 7B:
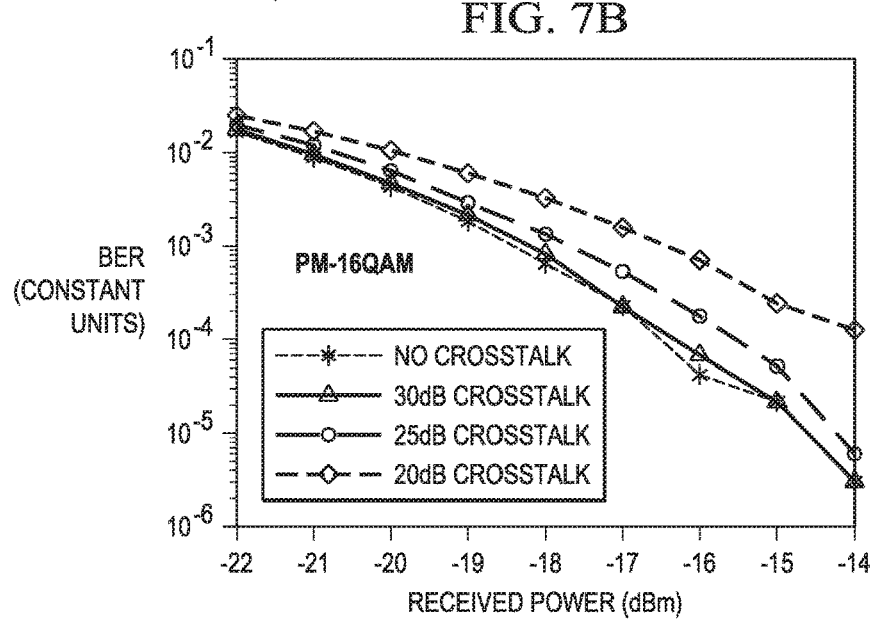
FIG. 7B is a graph 710 of BER for the setup of FIG. 4 using phase modulation, 16-level quadrature amplitude modulation QAM (PM-16QAM).

FIG. 7A is a graph 700 of BER for the setup 400 of FIG. 4 using PAM4 with various crosstalks. FIG. 7B is a graph 710 of BER for the setup 400 of FIG. 4 using PM-16QAM. For the graphs 700, 710, the x-axes represent the power in units of dBm of signals received by the receiver 445, and the y-axis represents BER in constant or arbitrary units. Both the graph 700 and the graph 710 include a star plot representing no crosstalk, a diamond plot representing 30 dB of crosstalk, a circle plot representing 25 dB of crosstalk, and a diamond plot representing 20 dB of crosstalk. In this case, crosstalk represents the MPI. For a BER of $4e^{-3}$, the graph 710 shows a received power of about −20 dBm, which is 8.7 dB better than for the graph 700. By increasing crosstalk to 25 dB, the graph 710 shows about a 0.5 dB penalty in received power, while the graph 700 shows about a 1.3 dB penalty. By increasing the crosstalk to 20 dB, the graph 710 shows about a 1 dB additional penalty in received power, while the graph 700 shows a signal failure because of a large BER floor at a BER of about $9e^{-3}$. Thus, PM-16QAM has a higher tolerance to the MPI effect than PAM4.

Figure 8:
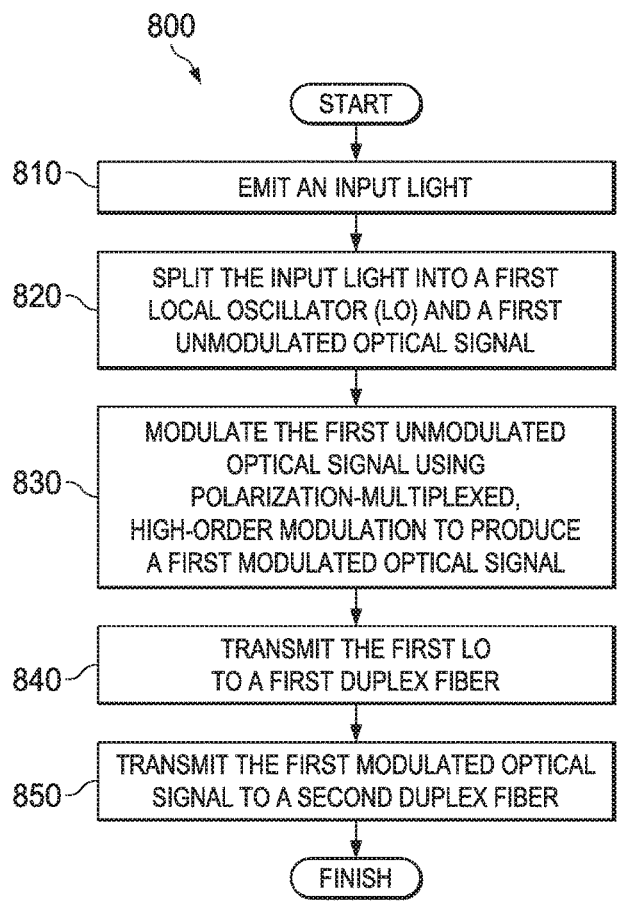
FIG. 8 is a flowchart illustrating a method of SHD transmission according to an embodiment of the disclosure.

FIG. 8 is a flowchart illustrating a method 800 of SHD transmission according to an embodiment of the disclosure. The nodes 103, 135, 200, 300 implement the method 800 when they transmit signals. At step 810, an input light is emitted. For instance, the laser 105 emits the input light. At step 820, the input light is split into a first LO optical signal and a first unmodulated optical signal. For instance, the splitter 110 splits the input light into the first LO optical signal and the first unmodulated optical signal. At step 830, the first unmodulated optical signal is modulated using polarization-multiplexed, high-order modulation to produce a first modulated optical signal. For instance, the modulator 113 modulates the first unmodulated optical signal using PM-16QAM to produce a first modulated optical signal. At step 840, the first LO optical signal is transmitted to a first duplex fiber. For instance, the LO port 125 transmits the first LO optical signal to the LO fiber 130. Finally, at step 850, the first modulated optical signal is transmitted to a second duplex fiber. For instance, the signal port 127 transmits the first modulated optical signal to the signal fiber 133.

Figure 9:
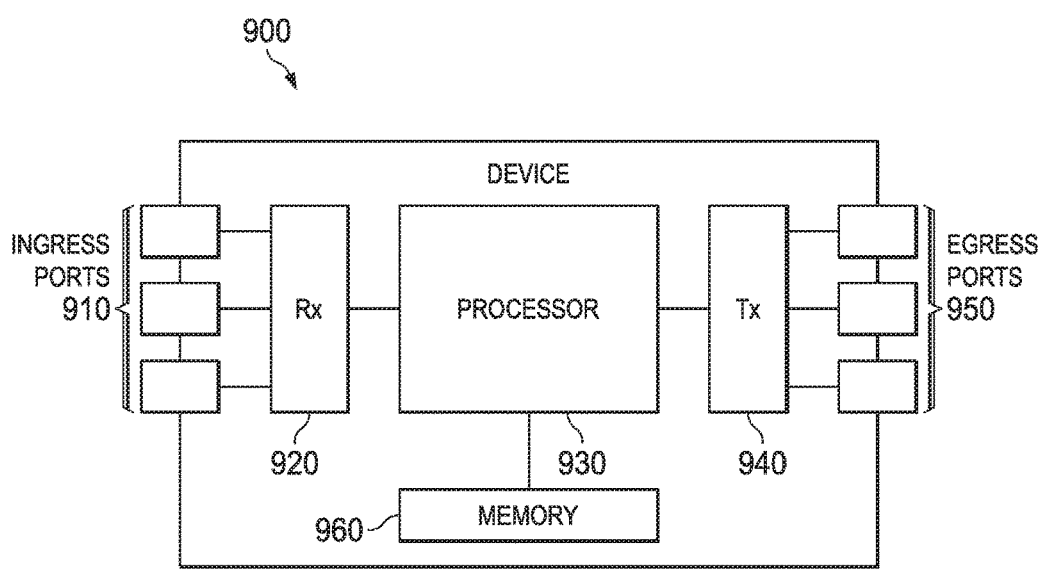
FIG. 9 is a schematic diagram of a device.

FIG. 9 is a schematic diagram of a device 900. The device 900 is suitable for implementing the disclosed embodiments. For instance, the device 900 implements the interface ICs 107, 160, 210, 310; the modulators 113, 153, 220, 320; the ADC & DSPs 115, 155, 225, 325; and the receivers 123, 147, 240, 340. The device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by any suitable combination of hardware, middleware, and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960.

The memory 960 comprises one or more disks, tape drives, and solid-state drives and may be used as an overflow data storage device, to store programs when such programs are selected for execution, and to store instructions and data that are read during program execution. The memory 960 may be volatile and non-volatile and may be read-only memory (ROM), random-access memory (RAM), ternary content-addressable memory (TCAM), and static random-access memory (SRAM).

A first component is directly coupled to a second component when there are no intervening components, except for a line, a trace, or other media, between the first component and the second component. The first component is indirectly coupled to the second component when there are intervening components between the first component and the second component. The termed "coupled" and its derivatives includes both directly coupled and indirectly coupled. The use of the term "about" means a range including ±10% of the subsequent number, unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an uncooled laser;
   a splitter coupled to the uncooled laser;
   a first wavelength component coupled to the splitter;
   a local oscillator (LO) port coupled to the first wavelength component;
   a modulator coupled to the splitter;
   a second wavelength component coupled to the modulator;
   a signal port coupled to the second wavelength component;
   a receiver coupled to the second wavelength component;
   an analog-to-digital converter (ADC) and digital signal processor (DSP) coupled to the receiver; and
   an interface integrated circuit (IC) directly connected to the ADC and DSP and the modulator.

2. The apparatus of claim 1, wherein the first wavelength component and the second wavelength component are thin-film filters (TFFs).

3. The apparatus of claim 1, wherein the first wavelength component and the second wavelength component are 3 decibel (dB) optical couplers.

4. The apparatus of claim 1, wherein the first wavelength component and the second wavelength component are optical isolators.

5. The apparatus of claim 1, wherein the uncooled laser is a distributed feedback (DFB) laser.

6. The apparatus of claim 1, wherein the uncooled laser comprises a linewidth of greater than 100 kilohertz (kHz).

7. The apparatus of claim 1, wherein the uncooled laser comprises a linewidth of 1 megahertz (MHz) or greater.

8. The apparatus of claim 1, wherein the LO port is configured to communicate with a first component external to the apparatus, and wherein the signal port is configured to communicate with a second component external to the apparatus.

9. The apparatus of claim 1, wherein the uncooled laser, the splitter, the first wavelength component, and the LO port form a first light path, and wherein the uncooled laser, the splitter, the modulator, and the signal port form a second light path.

10. An optical transceiver comprising:
    a laser configured to provide an input light;
    a splitter coupled to the laser and configured to split the input light into a first local oscillator (LO) optical signal and a first unmodulated optical signal;
    a modulator coupled to the splitter and configured to modulate the first unmodulated optical signal to produce a first modulated optical signal;
    an LO port configured to:
      couple to a first duplex fiber; and
      transmit the first LO optical signal to the first duplex fiber; and
    a signal port configured to:
      couple to a second duplex fiber; and
      transmit the first modulated optical signal to the second duplex fiber.

11. The optical transceiver of claim 10, wherein the LO port is further configured to receive a second LO optical signal from the first duplex fiber, and wherein the signal port is further configured to receive a second modulated optical signal from the second duplex fiber.

12. The optical transceiver of claim 11, further comprising a receiver configured to:
    receive the second LO optical signal; and
    receive the second modulated optical signal.

13. The optical transceiver of claim 12, wherein the receiver is configured to perform coherent detection.

14. The optical transceiver of claim 12, further comprising a first wavelength component coupled to the splitter, the receiver, and the LO port and configured to:
    pass the first LO optical signal to only the LO port; and
    pass the second LO optical signal to only the receiver.

15. The optical transceiver of claim 14, further comprising a second wavelength component coupled to the modulator, the receiver, and the signal port and configured to:
    pass the first modulated optical signal to only the signal port; and
    pass the second modulated optical signal to only the receiver.

16. The optical transceiver of claim 11, further comprising a receiver, wherein the laser and the receiver are configured to implement self-homodyne detection (SHD).

17. The optical transceiver of claim 11, further comprising a first thin-film filter (TFF) coupled to the splitter and the LO port and configured to:
    pass light at a first wavelength; and
    reflect light at all other wavelengths.

18. The optical transceiver of claim 17, further comprising a second TFF coupled to the modulator and the signal port and configured to:
    pass light at a second wavelength; and
    reflect light at all other wavelengths.

19. The optical transceiver of claim 11, wherein the modulator is further configured to further modulate the first unmodulated optical signal using polarization-multiplexed, high-order quadrature amplitude modulation (QAM).

20. A method comprising:
- emitting an input light;
- splitting the input light into a first local oscillator (LO) optical signal and a first unmodulated optical signal;
- modulating the first unmodulated optical signal using polarization-multiplexed, high-order modulation to produce a first modulated optical signal;
- transmitting the first LO optical signal to a first duplex fiber; and
- transmitting the first modulated optical signal to a second duplex fiber.

21. The method of claim 20, further comprising:
- receiving a second LO optical signal from the first duplex fiber;
- receiving a second modulated optical signal from the second duplex fiber;
- detecting amplitude information and phase information from the second modulated optical signal using the second LO optical signal to produce an analog detected signal;
- converting the analog detected signal to a digital detected signal; and
- processing the digital detected signal.

* * * * *